Figure 7:
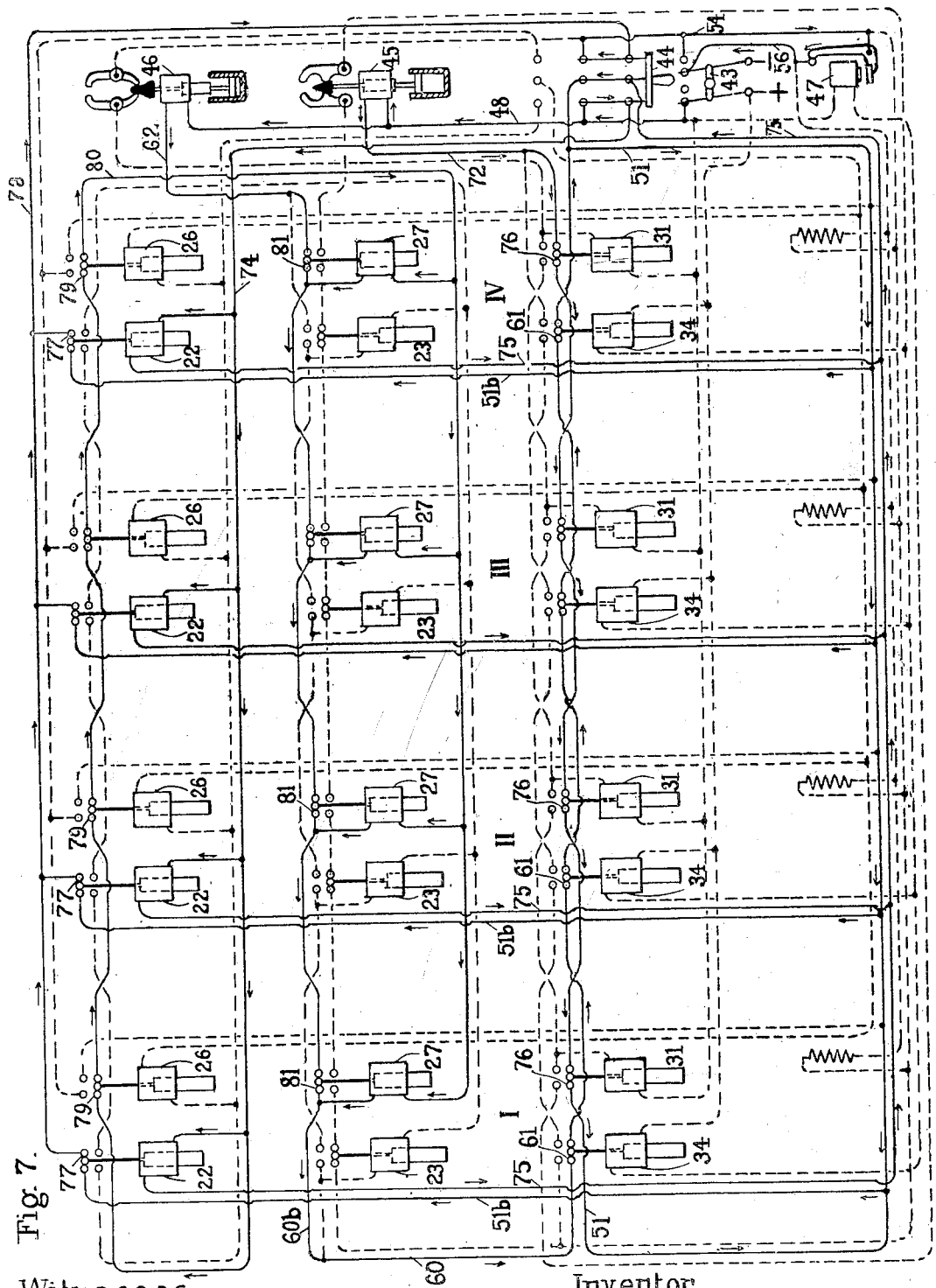

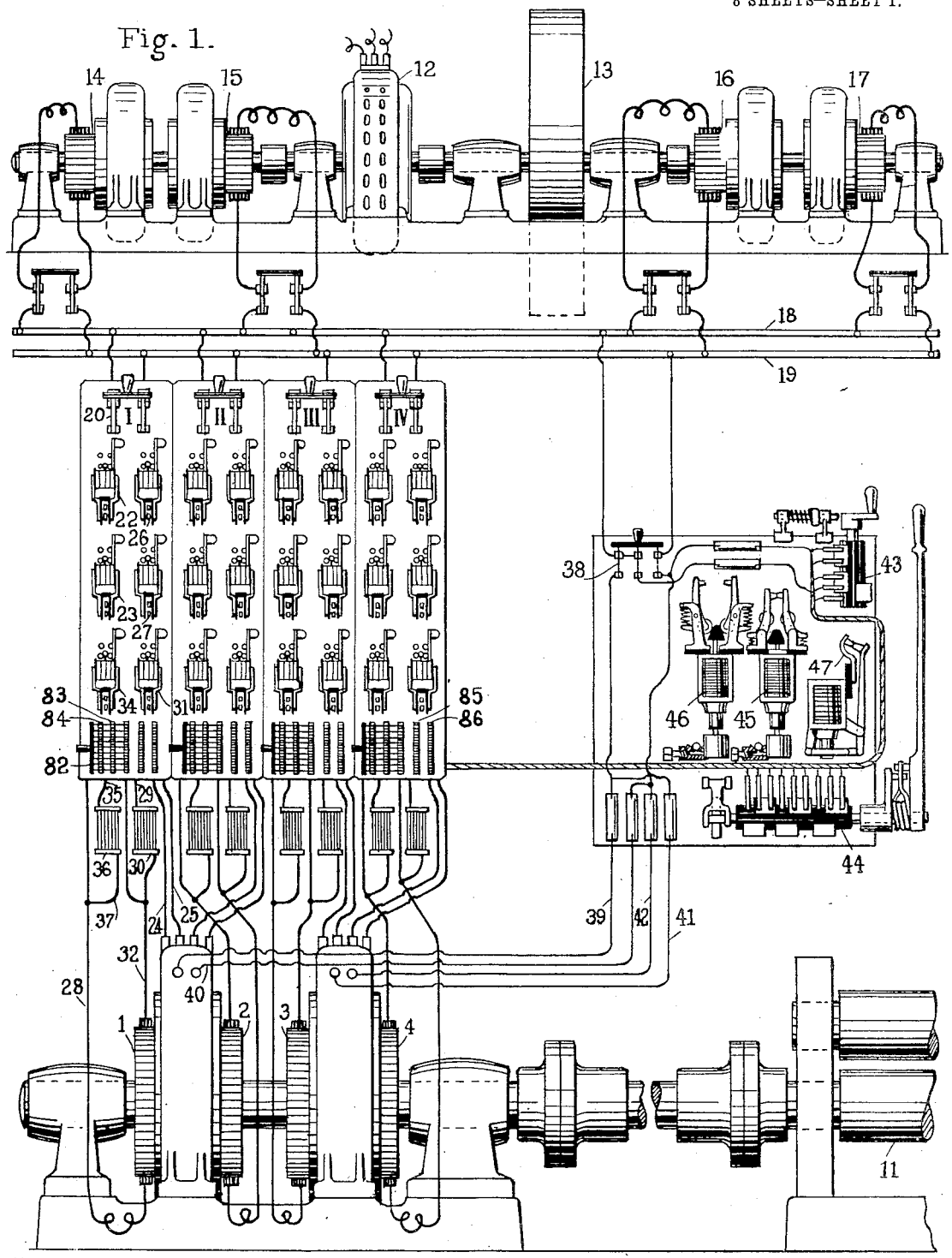

G. DUNN.
MOTOR CONTROL SYSTEM.
APPLICATION FILED JAN. 4, 1913.
1,104,785.
Patented July 28, 1914.
8 SHEETS—SHEET 2.
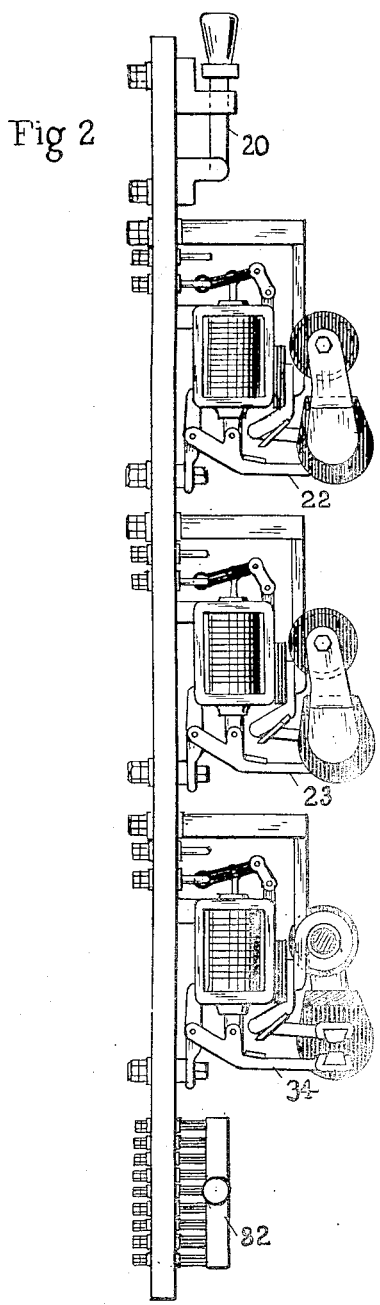
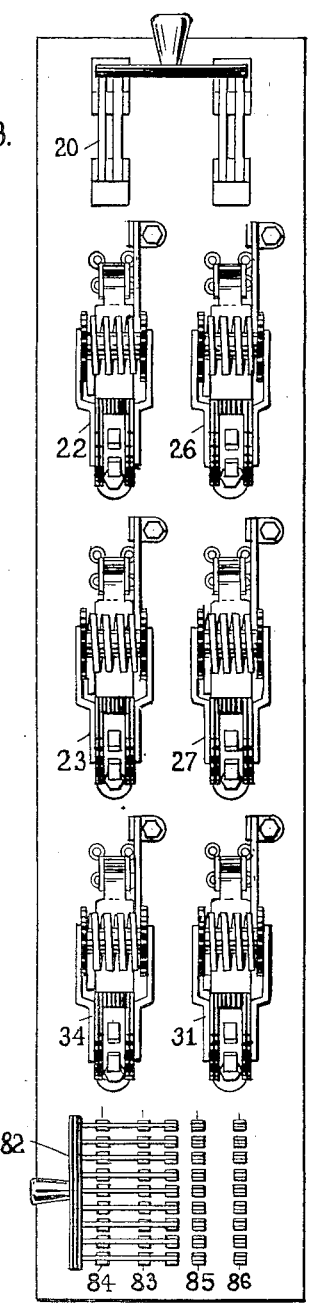
Witnesses:
Samuel W. Balch
Frank C. Cole
Inventor,
Gano Dunn,
by Thomas Ewing Jr.,
Attorney.

G. DUNN.
MOTOR CONTROL SYSTEM.
APPLICATION FILED JAN. 4, 1913.
1,104,785.
Patented July 28, 1914.
8 SHEETS—SHEET 3.
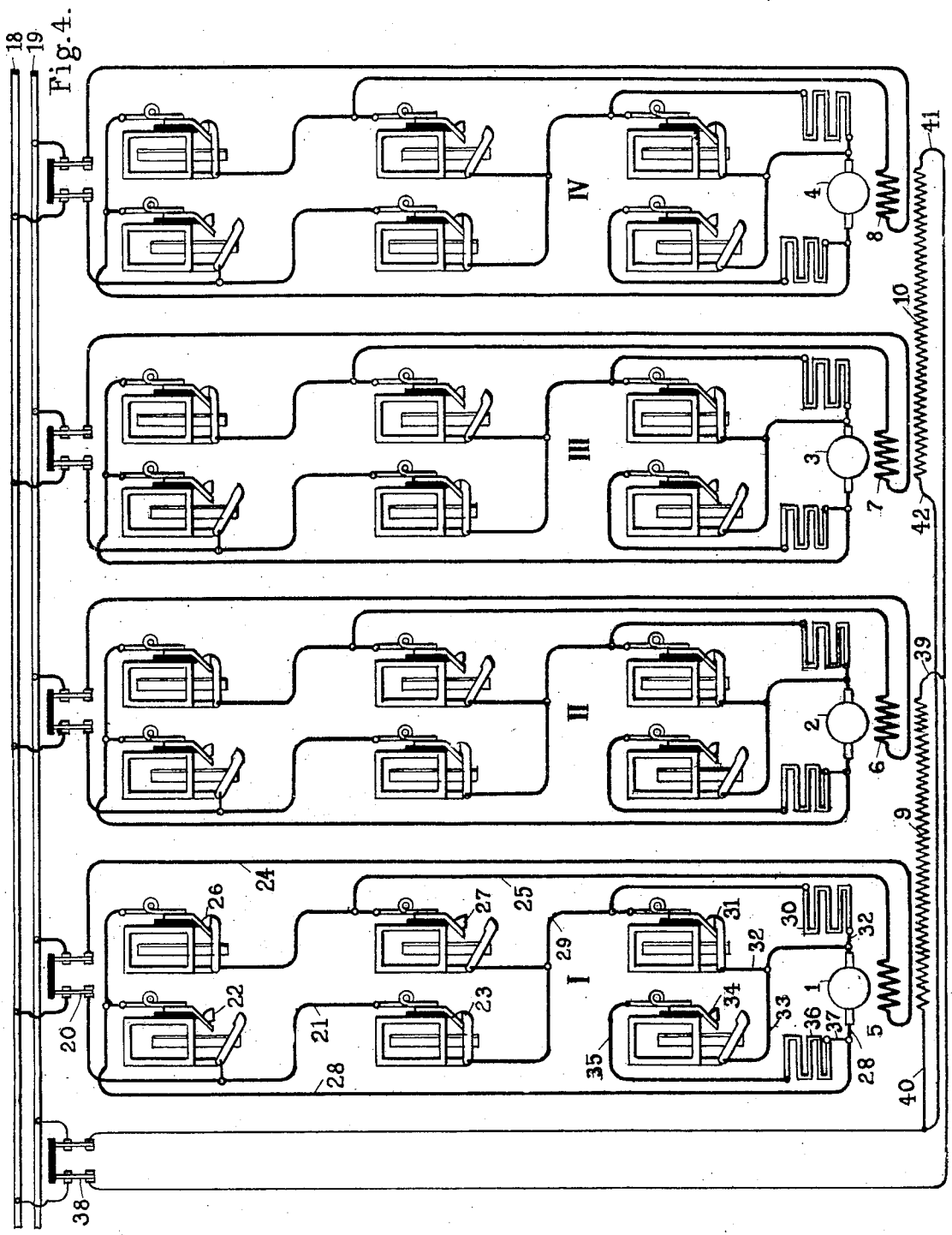

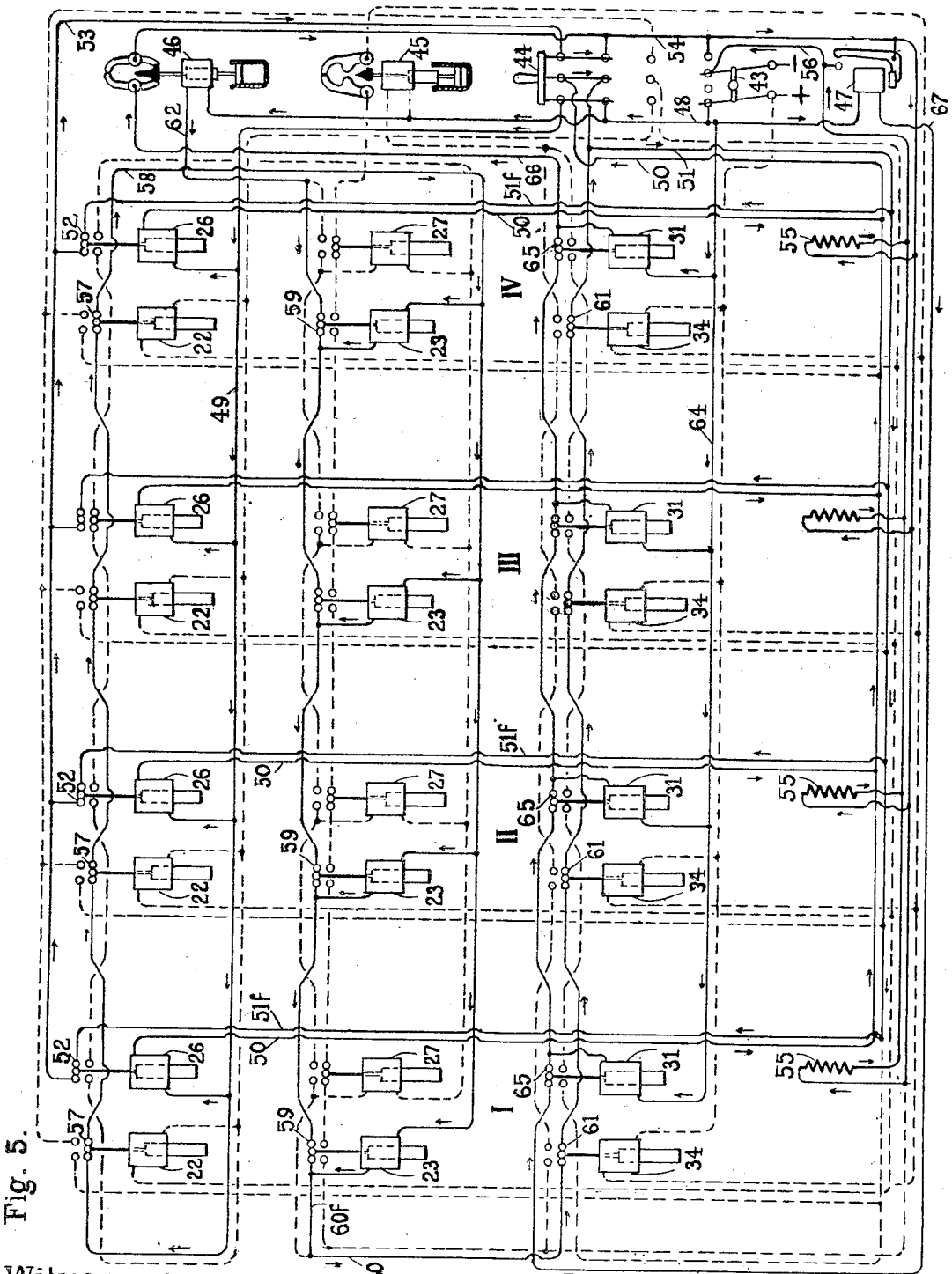

G. DUNN.
MOTOR CONTROL SYSTEM.
APPLICATION FILED JAN. 4, 1913.
1,104,785.
Patented July 28, 1914.
8 SHEETS—SHEET 5.
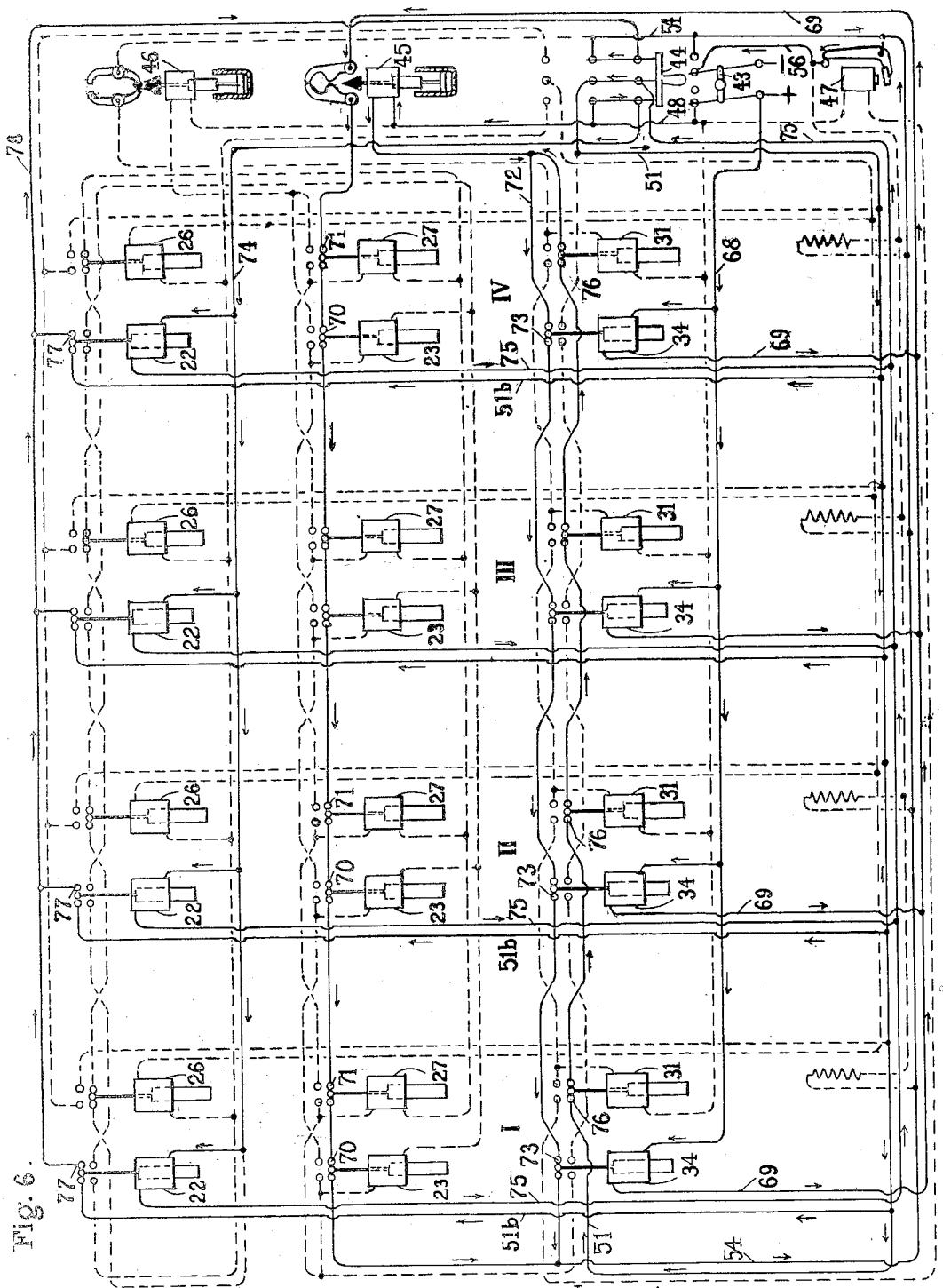

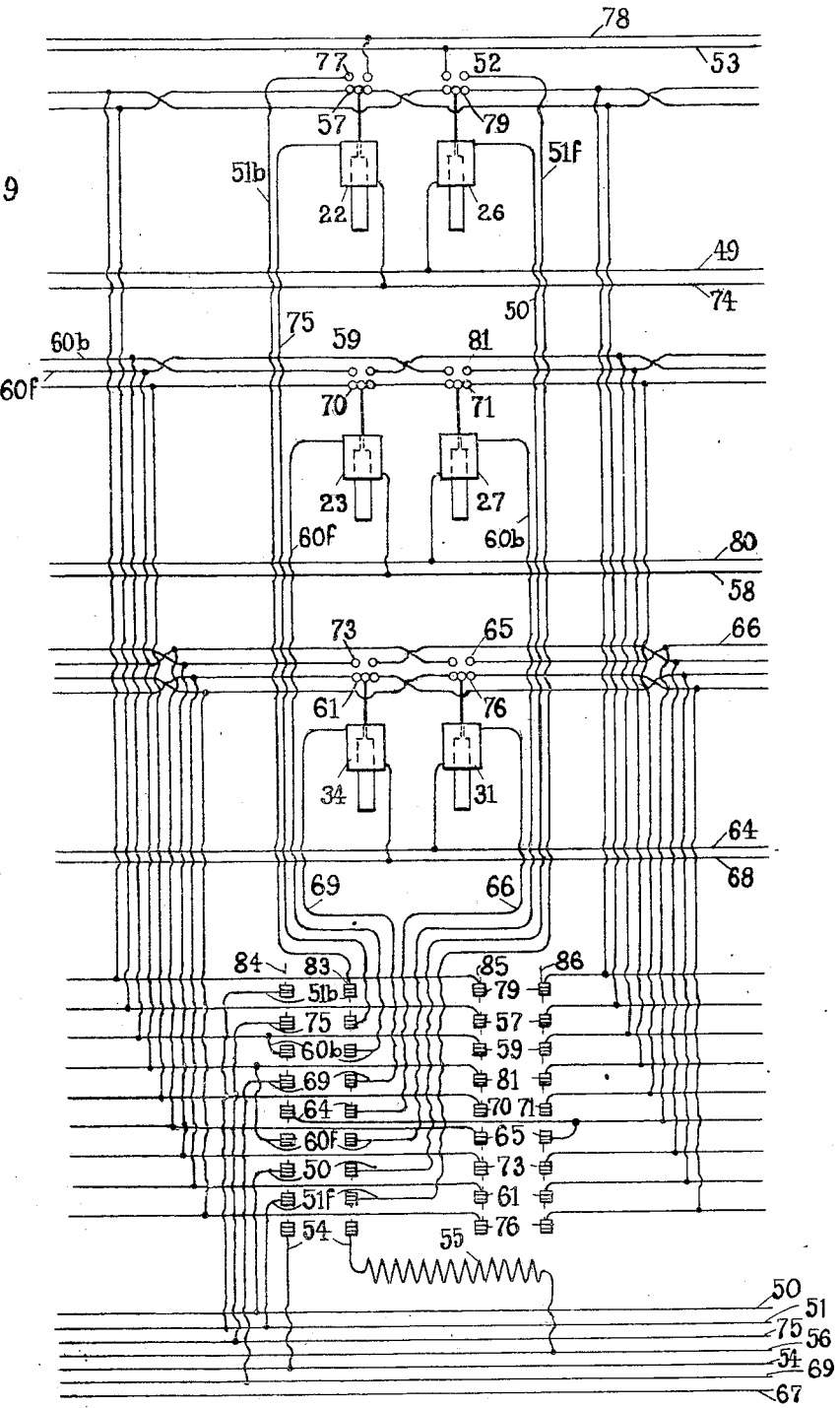

UNITED STATES PATENT OFFICE.

GANO DUNN, OF NEW YORK, N. Y., ASSIGNOR TO CROCKER-WHEELER COMPANY, OF AMPERE, NEW JERSEY, A CORPORATION OF NEW JERSEY.

MOTOR-CONTROL SYSTEM.

1,104,785.  Specification of Letters Patent.  Patented July 28, 1914.

Application filed January 4, 1913. Serial No. 740,167.

*To all whom it may concern:*

Be it known that I, GANO DUNN, a citizen of the United States of America, and a resident of the city of New York, borough of Manhattan, county of New York, and State of New York, have invented certain new and useful Improvements in Motor-Control Systems, of which the following is a specification.

My invention relates to systems wherein electrically driven machines requiring large amounts of power have to be frequently and quickly reversed, the particular application being to the operation of rolling mills of the two-high type in which it is important to make frequent passes of the slab in alternate directions and without keeping the slab waiting between passes for the mill to reverse.

The object of this invention is to provide an electric driving system which will meet these requirements, and possess simplicity, reliability, durability, speed and economy of operation. Under these service conditions an amount of power is required which cannot be provided in a single motor of a type suitable for quick reversal and control, and an amount of current is required which is beyond the capacity of a single contactor of a type suited to frequent and rapid operation. Rapid reversal involves the overcoming of the inertia not only of the rolls but also in the moving masses of the driving motor and were a single motor to be employed the power required in overcoming the inertia of the motor alone in the required time would severely tax its power. Both of these difficulties are solved by subdividing the motive power. By dividing the power between a plurality of armature windings, the current for each is kept separate and independently broken, and by placing these windings on a plurality of armature cores their diameters may be lessened and their total inertia materially reduced. The short interval of time in which it is required to stop, reverse and speed up the mill limits materially the number of resistance steps through which the motor can be carried and involves an increased amount of current and mechanical strain as each step is initiated, and to avoid this surge and mechanical strain coming on the system as a whole provision is made for effecting the closure at different times of corresponding admission contactors in the circuits of the several motors whereby the draft on the generators and the acceleration of the rolls is made more uniform.

Further improvements relate to the provision of switches in the control circuits and the motor circuits whereby any motor or several motors and their control apparatus may be cut out in event of any disability to the circuit or control apparatus without disarranging the control and operation of the other motors.

Figure 8:
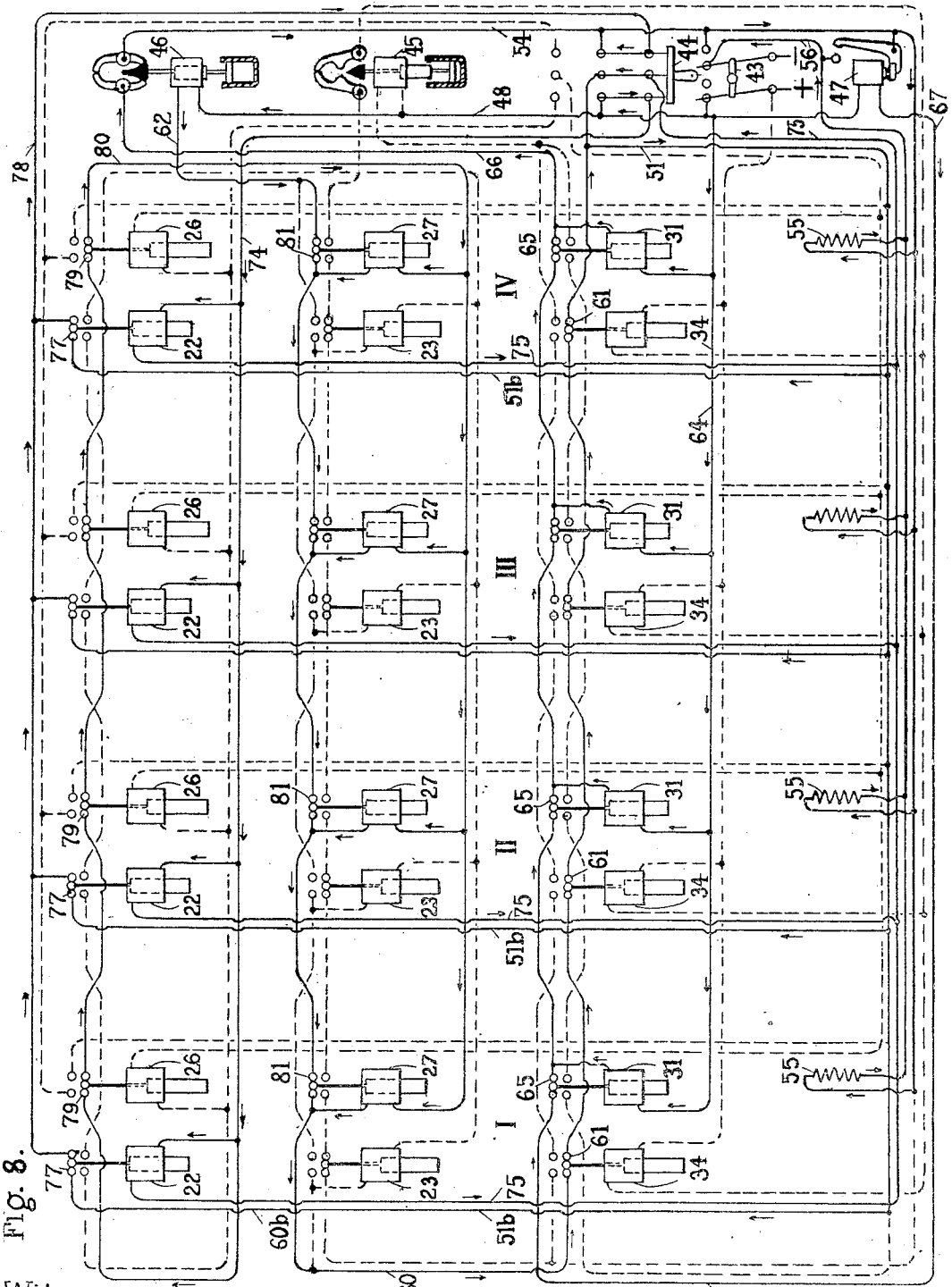

In the accompanying eight sheets of drawings which form a part of this application Figure 1 is a general view of apparatus constructed in accordance with my invention with six contactors for each motor showing in elevation the generators, motors, rolling mill, contactors for electrical control, master switches and other essential apparatus together with a diagrammatic representation of their electrical interconnection. Fig. 2 is a side view of one of the main contactor panels. Fig. 3 is an elevation of the panel. Fig. 4 is a diagram showing the motor circuits with the contactors closed for the forward running position. Fig. 5 is a diagram of the control circuits omitting the panel-cutout switches and showing in full line the control circuits which are energized when the motors are running forward. Fig. 6 is a similar diagram showing the contactors closed for dynamic braking of the motors immediately following the throwing of the motor switch for reversing the mill. Fig. 7 is a similar diagram showing the contactors in the positions following the dynamic braking for the supply of current to each motor through a resistance step. Fig. 8 is a similar diagram showing the final position of the contactors for reverse running. Fig. 9 is a diagram showing the control of one panel and including the cut out switches.

Four electric motors as to armature windings and commutators 1 2 3 4 and field windings 5 6 7 8 in series with the armature windings respectively are combined in two motor units, windings 1 and 2 and fields 5 and 6 being in one unit and windings 3 and 4 and fields 7 and 8 being in the other unit. In addition the motor units have shunt field windings 9 and 10 not separated into parts individually associated with each of the four armature and field windings. The motors are directly connected and in axial line with one of the rollers of a two-high rolling mill 11. A motor-generator set consisting of an induction motor 12, a fly wheel 13 and four direct-current generators 14 15 16 17 supplies current from the generators through positive and negative bus bars 18 19 to the motors through contactors on four panels I II III IV. The current is led to each panel through an admission switch 20. Thence from one side of the switch is a connection through a lead 21 to electrically operated admission contactors 22 and 23 and from the other side of the switch is a connection through a lead 24 to the series field and returning through lead 25 to electrically operated admission contactors 26 and 27. From the other contacts of contactors 22 26 is a lead 28 to one of the brushes for the motor armature winding and from the other contact of contactors 23 27 is a lead 29 which branches, one branch leading to a block of resistance 30 and the other to a resistance controlling contactor 31. From the other contact of this contactor and from the other terminal of the resistance is a lead 32 to the other brush for the motor armature winding. This block of resistance is for use in starting the motor, and the contactor when open diverts the current through this resistance.

A shunt circuit for the armature for dynamic braking is provided from the brush lead 32 through a lead 33, dynamic brake contactor 34, lead 35, block of resistance 36 and lead 37. It is convenient to use the other leads to the brushes in part for these connections. The shunt fields are supplied from the bus bars through a switch 38, leads 39 40 to the field of the first motor unit and leads 41 42 to the field of the second motor unit. The mill is brought to its full speed by carrying each motor armature through two steps the first of which connects it through resistance to the source of current, and the second of which cuts out the resistance by closing a shunt. A greater number of steps is avoided because of the short interval in which the mill must be speeded up particularly when reversing, and because the successive as distinguished from the simultaneous electrical connection of the four elements of the total group serves as the equivalent of a greater number of steps where there is only one unit.

The order of operation of the contactors in starting up the mill and in reversing will first be pointed out, and the motor circuits traced and the control system by which this is secured will then be described.

To start the mill forward, referring to the diagram of the motor circuits Fig. 4 the four contactors 26 26 of the four panels are first closed together, but these by themselves do not complete any circuits. Then commencing with panel I the contactors 23 23 are closed one after the other in quick succession. The other contactors being open, circuits will be closed through each motor from the admission switch through lead 21, contactor 23, lead 29, resistance block 30, lead 32, motor armature 1 2 3 or 4, lead 28, contactor 26, lead 25, series field 5 6 7 or 8, and lead 24 back to the source of current supply. Current is thereby admitted through resistance in succession to each of the four armature windings and its corresponding series field, and as the surge of current occurring at the moment of closure is into but one armature winding and series field at a time, the strain on the generator system and the accompanying mechanical stresses in both the driving and the driven systems will be distributed over the interval of time required for the successive operation of the admission contactors. As the mill is speeding up at the same time the surge of current will be greatest on the first armature winding and its commutator, and will be opposed by increasing counter-electromotive forces from the windings which are last connected. The next step of cutting out the blocks of resistance commences after a relatively longer interval than there was between the initial connections and these steps are taken in reverse order by the successive closures of the contactors 31 31, the circuit around the resistance at panel IV being first made, so that in this series the greatest strain will come on the fourth armature winding and the maximum strains incident to the two series of steps will come on different motors thereby equalizing the heating of the motors and resistance and the wear of the commutators. The final circuit at each panel is then from the admission switch through lead 21, contactor 23, lead 29, contactor 31, lead 32, motor armature 1 2 3 or 4, lead 28, contactor 26, lead 25, series field 5 6 7 or 8, and lead 24 back to the source of current supply. The contactors are then closed as shown in Figs. 4 and 5.

In reversing the mill from forward to reverse running the contactors which were closed for forward running as in Figs. 4 and 5 are opened simultaneously, or as nearly so as is to be expected falling independently by gravity. Following and dependent on their proper operation or at least of the dropping of the contactors 23 23 of all the panels the opening of which is sufficient to cut off the motors from source of current, the dynamic-brake contactors 34 34 of all the panels are simultaneously closed and the armature windings are short circuited through the resistances 36 36 the series fields being cut out. This quickly overcomes the inertia of the motors. There is no occasion for successive action as the circuits are wholly independent of each other, thus dividing the electrical strain, and as each motor has chiefly to overcome its own inertia there is only the mechanical strain of overcoming the inertia of the rolls in common. Besides this strain is assisted by friction, the braking action can therefore as well be simultaneous to save time. The current flow in braking which is of opposite direction to that in running results in a storage of magnetic energy, which energy on the motors coming to rest causes the braking current to continue to flow due to self-induction. Since the braking current is a reversed current it gives the motors without any change of electrical connections a start in the opposite direction, and it is desirable to so adjust the inductance and resistance upon the proper ratio between which the continuance of the braking current depends so that full advantage may be taken of this energy. Immediately after the closure of the dynamic-brake contactors the contactors 22 22 of all the panels are closed but no circuits are thereby established while the contactors 27 27 remain open. Dynamic-braking of the motors then continues for the required time after which dynamic-brake contactors 34 34 are opened, and, with the mill already started in reversed direction, commencing with panel I at the left, the four contactors 27 27 are closed one after the other in quick succession, and the contactors 22 22 being already closed circuits will be successively closed through the resistances 30 30 to each of the four armature windings in the reverse direction, the direction through the series field remaining the same from the admission switch through lead 21, contactor 22, lead 28, motor armature 1 2 3 or 4, lead 32, resistance block 30, lead 29, contactor 27, lead 25, series field 5 6 7 or 8, and lead 24 back to the source of current supply. The apparatus then accelerates as above described for forward movement as current is admitted in succession to each of the four armature windings. This is continued for the required time and then commencing with panel IV at the right the four contactors 31 31 are closed and successively cut out the resistance in series with each armature winding leaving the connections for full speed reverse operation.

Change from reverse to forward movement involves similar operation of the contactors, the foregoing description fully applying with the contactors 26 for 22 and 23 for 27.

The current for controlling the operation of the contactors is led from the bus bars through the switch 38, through which also passes the current for the shunt fields, but on one side through a separate blade so that when the switch is opened the field and control circuits will be separated. Thence the current is conducted through various circuits, some of which lead through control contacts on certain of the contactors to the solenoids of other contactors and other circuits lead through a quick-stop switch 43 and a reversing switch 44 to the contactors. In addition there is an adjustable dynamic-brake delay relay 45 which holds the dynamic-brake contactors in position for dynamic braking for the required interval of time, and an adjustable acceleration-delay relay 46 which determines the time in circuit of the resistance steps. Each of these relays is connected to a dash pot suitably valved and with a screw adjusted inlet so that the armature will be permitted to fall freely but will lift slowly. A protection relay 47 operates to introduce resistances in the control circuits and limit the heating of the contactor solenoids when the contactors are in position for full speed running.

For full speed forward running five branch control circuits are established which are indicated in full line in Fig. 5. From the positive bus bar one circuit is through quick-stop switch 43, lead 48, reversing switch 44, lead 49, contactors 26 26, lead 50, reversing switch 44, lead 51, upper control contacts 52 52, in multiple, of the contactors 26 26, lead 53, reversing switch 44, lead 54, protection resistances 55 55, lead 56, and quick-stop switch 43 to the negative bus bar, thereby holding closed the admission contactors 26 26. A second circuit follows the same course as above to the lead 49, thence it is led through lower control contacts 57 57, in series, of contactors 22 22, lead 58, contactors 23 23, upper control contacts 59 59 of the contactors of panels I II and III, lead 60, lower control contacts 61 61, in series, of dynamic-brake contactors 34 34, and thence joining the first circuit at lead 51 the remainder of the course is the same to the negative bus bar, thereby holding closed the admission contactors 23 23. A third circuit branches from the preceding circuits at lead 48 and is thence through the acceleration-delay relay 46, lead 62, and thence rejoining the second circuit through the upper control contacts 59 59, in series, to the negative bus bar thereby holding closed the contacts of the acceleration-delay relay. A fourth circuit branches from the preceding circuits at lead 48 and is thence through lead 64, resistance-controlling contactors 31 31, upper control contacts 65 65, in series, of the resistance-controlling contactors of panels II III and IV, lead 66, contacts of the acceleration-delay relay 46, and thence joining the other circuits at the lead 54 to the negative bus bar, thereby holding closed the resistance-controlling contactors which shunt the resistance in the motor circuit. A fifth circuit branches from the preceding circuits at lead 48 and is thence through protection relay 47, lead 67, and thence joining the preceding circuit at the upper control contacts 65 65 to the negative bus bar, thereby holding open the contacts of the protection relay and cutting the resistances 55 55 into all of the control circuits.

To reverse the mill the reversing switch is thrown to its opposite contacts as shown in Fig. 6, thereby opening the first three of the above traced control circuits at this switch and dropping the two sets of admission contactors and the acceleration-delay relay. The acceleration-delay relay opens the fourth circuit and drops the resistance-controlling contactors. These contactors at their upper control contacts open and release the protection relay thereby shunting the resistance and permitting the control circuits to be ready to flow with full strength. As soon as all the admission contactors 23 23 drop, a circuit is closed from the positive bus bar through lead 68, the dynamic-brake contactors 34 34, lead 69, contacts of the dynamic-brake delay relay 45, lower control contacts 70 70 of the admission contactors 23 23 and lower control contacts 71 71 of the admission contactors 27 27, all of which control contacts are in series, lead 54, contacts of the protection relay 47, lead 56, and switch 43 to the negative bus bar, thereby closing all the dynamic-brake contactors 34 34. As soon as the dynamic-brake contactors respond a circuit is closed from the positive bus bar through switch 43, lead 48, dynamic-brake delay relay 45, lead 72, upper control contacts 73 73, in series, of the dynamic-brake contactors 34 34, and thence joining the preceding circuit through lead 54 to the negative bus bar. The dynamic-brake delay relay being retarded by a dash pot responds slowly. These last two circuits are independent of the closure of the reversing switch to the other contacts, but this switch is organized to snap from the one set of contacts to the other so that it will be closed when the dynamic-brake contactors are up, and before the dynamic-brake delay relay can respond a circuit is closed from the positive bus bar through the switch 43, lead 48, reversing switch 44, lead 74, admission contactors 22 22, lead 75, reversing switch 44, lead 51, lower control contacts 76 76, in series, of the resistance-controlling contactors 31 31, and thence joining the preceding circuit through the control contacts 73 73 to the negative bus bar, thereby lifting the admission contactors. A second circuit through these is then closed through their own control contacts which is independent of the control contacts of the dynamic-brake and resistance-controlling contactors. This circuit is as before to lead 75 and thence through their upper control contacts 77 77, in multiple, lead 78, reversing switch 44, and thence joining the three preceding circuits through lead 54 to the negative bus bar.

When the dynamic-brake delay relay reaches the upper limit of its movement and opens the circuit through its contacts the dynamic-brake contactors open as shown in Fig. 7 and a circuit is closed from the positive bus bar through the switch 43, lead 48, reversing switch 44, lead 74, lower control contacts 79 79, in series, of the admission contactors 26 26, lead 80, admission contactor 27 of panel I, lead 60ᵇ and 60 lower control contacts 61 61 of the dynamic-brake contactors, in series, lead 51 and 51ᵇ, upper control contacts 77 77 of the admission contactors 22 22, lead 78, reversing switch 44, lead 54, contacts of protection relay 47, lead 56 and switch 43 to the negative bus bar. The closing of upper control contacts 81 81 of contactor 27 on panel I extends the lead 60ᵇ to contactor 27 on panel II and the circuit above traced is repeated through the coil of that contactor. In like manner the successive closures of the admission contactors 27 27 on panels II and III extends the circuit above traced through their upper control contacts 81 81 to the admission contactors 27 27 of panels III and IV thereby causing successive closure of these contactors and the successive connection of the motors to the source of current through resistance. The closure of the upper control contacts 81 81 of contactor 27 of panel IV extends the circuit to the acceleration-delay relay 46 and a circuit is made from the positive bus bar through switch 43, lead 48, acceleration-delay relay 46, lead 62 and thence joining the circuit above traced through the upper control contacts 81 81 to the negative bus bar. This relay being also retarded by a dash pot responds slowly, during which time the motors accelerate with blocks of resistance in their armature circuits.

When the acceleration-delay relay reaches the upper limit of its movement and closes the contacts controlled by it as shown in Fig. 8 a circuit is closed from the positive bus bar through switch 43, resistance-controlling contactor 31 of panel IV, lead 66, contacts of acceleration-delay relay 46, lead 54 contact of protection relay 47, lead 56, and switch 43 to the negative bus bar. The closing of upper control contacts 65 65 of contactor 31 on panel IV extends lead 66 to contactor 31 on panel III and the circuit above traced is repeated through the coil of that contactor. In like manner the successive closures of the resistance-controlling contactors 31 31 on panels III and II extends the circuit above traced through their upper control contacts 65 65 to the resistance-controlling contactors 31 31 of panels II and I thereby causing successive closures of these contactors and the successive cutting out of the blocks of resistance. On the lifting of the first of the resistance-controlling contactors the opening of the lower control contacts breaks the circuit through the dynamic-brake delay relay thereby permitting it to drop and its contacts to come together but no circuit is closed thereby.
In changing from reverse to forward movement similar circuits are successively made and broken and the foregoing description will apply by substituting admission contactors 26 and 23, their control contacts and leads to their contacts and coils, for the admission contactors 22 and 27 their control contacts and leads to their contacts and coils.

Quick stoppage of the mill is effected by throwing the quick-stop switch 43 to its opposite contacts. This breaks all circuits through the admission contactors, the resistance-controlling contactors and the relays irrespective of the position of the admisversing switch, and as soon as the admission contactors 23 23 or 27 27 have dropped as shown in Fig. 6 a circuit is closed from the positive bus bar through lead 68, dynamic-brake contactors 34 34, lead 69, contacts of relay 45, lower control contacts 70 70 and 71 71, in series, of the admission contactors 23 23 and 27 27, lead 54 and right contact of the quick-stop switch to the negative bus bar. The protection relay is cut out when this switch is operated for quick stop and to protect the circuits a spring is provided which throws it when released from quick stop to the middle position in which all circuits are open.
Provision is made for the disconnection from the circuits of any of the motors and their corresponding panels of controlling contactors and the operation of the mill by the remaining motors and panels of contactors in the manner already described. The motors are disconnected at the switches 20 20, Figs. 1, 2 and 3. The control circuits leading to the coils of the contactors are disconnected from the coils by opening a nine pole switch 82, shown in Figs. 1, 2 and 3, thereby, as will be seen in Fig. 9, breaking the connection between the two lines of contacts 83 84 through which the leads 50 75 60ᵃ 60ᵇ 66 and 69 pass to the contactor coils, and the leads 51ᵗ and 51ᵇ to the upper control contacts of the upper row of admission contactors, these being in multiple relation with the corresponding control contacts of the other panels. The switch is then closed on the two lines of contacts 85 86 at which the other control contacts 57 59 61 65 70 71 73 76 79 and 81 are repeated, these being the contacts which are in series with corresponding control contacts of the other panels.
Contacts 70 and 71 being in series are bridged by one pole. When the switch is thus thrown over the control contacts on the panel may be open or closed in any combination without interfering with the operation of the mill from the other panels through the motors controlled therethrough. The leads leading to the left out of the row of contacts 85 lead to the row of contacts 86 of the adjoining panel at the left and the leads leading to the right out of the row of contacts 86 lead to the row of contacts 85 of the adjoining panel at the right. The complete system of control circuits consists of connected repeats of this diagram with the addition of the interconnections at the left of panel I and the right of panel IV and the connections to the operating switches and relays shown in the preceding diagrams.
In checking the speed of an electric motor by establishing a braking circuit with resistance through the armature after it has been cut off from the source of power as usually practised, the resistance necessary to protect the armature and prevent the initial check from overstraining the mechanical connections is so great that there is practically no continuance of induced current, and the generated current falls off with the speed so that, in theory, disregarding friction they would gradually approach and indefinitely reach a zero valve. It is only after a critically low value of resistance is reached relative to the inductance, and a value which under usual operating conditions would amount to an inadmissible short circuit, that the current is sustained and fed from the magnetic storage of energy after the motor has come to rest with the result that it will start up again in a contrary direction, and in theory with a frictionless machine continue to reverse. This relation of resistance to inductance which results in an oscillatory discharge of magnetically stored energy is the same in principle as the oscillatory discharge from electrostatic storage which is usually discussed. The requisite conditions while admitting of mathematical statement owing to the difficulty of determining the inductance, are, most simply found experimentally by reducing the resistance until the motors are seen to reverse. This is practicable in the application here under consideration owing to the fact that the motors are wound for slow speed and have armatures of relatively high inductance, and further that they are of a rugged character with high overload capacity.

It is not essential to the control features of my invention herein shown that the contactors 22 22 and 26 26 should control admission of current to the motors from the source of supply, and claims are drawn in which these are defined as pilot relays for opening and closing contacts in the control circuits to secure the proper sequence of operation of the admission and dynamic-brake contactors.

What I claim as new, and desire to secure by Letters Patent of the United States, is—

1. The combination of a driven machine, a plurality of electric motors therefor, a separate set of contactors for controlling the admission and rheostatic control of current to the armature of each motor, and means for insuring the closure at different times of the corresponding admission contactors and the corresponding resistance-controlling contactors, substantially as described.

2. The combination of a driven machine, a plurality of electric motors therefor, a separate set of contactors for controlling the admission and rheostatic control of current to the armature of each motor, and means for insuring the closure at different times in a definite order of the corresponding admission contactors, and the closure at different times in a reversed order, as to the motors controlled, of the corresponding resistance-controlling contactors, substantially as described.

3. The combination of a driven machine, a plurality of electric motors therefor, a common source of supply for the motors, a separate set of contactors for controlling the admission and rheostatic control of current to the armature of each motor, and means for insuring the closure at different times of the corresponding admission contactors and the corresponding resistance-controlling contactors, substantially as described.

4. The combination of a driven machine, a plurality of electric motors therefor, positive mechanical interconnections for the machine and motors, separate contactors for controlling the armature circuit in each motor, and means for insuring the closure at different times of the corresponding admission contactors, substantially as described.

5. The combination of a driven machine, a plurality of electric motors therefor, positive mechanical interconnections for the machine and motors, a separate set of contactors for controlling the admission and rheostatic control of current to the armature of each motor, and means for insuring the closure at different times of the corresponding admission contactors and the corresponding resistance-controlling contactors, substantially as described.

6. The combination of a driven machine, a plurality of electric motors therefor, positive mechanical interconnections for the machine and motors, a common source of supply for the motors, a separate contactor for controlling the armature circuit in each motor, and means for insuring the closure at different times of the corresponding admission contactors, substantially as described.

7. The combination of a driven machine, a plurality of electric motors therefor, separate successively operating magnet-controlled admission contactors for each motor, means for initiating the operation of the contactors and control contacts closed by the first operating contactors for admitting current to the subsequently operating contactors, substantially as described.

8. The combination of a driven machine, a plurality of electric motors therefor, separate successively operating magnet-controlled admission and rheostatic-control contactors for each motor, means for initiating the operation of the admission contactors, control contacts closed by the first operating admission contactors for admitting current to the subsequently operating admission contactors, means for initiating the operation of the rheostatic-control contactors after the admission contactors have operated, and control contacts closed by the first operating rheostatic-control contactors for admitting current to the subsequently operating rheostatic-control contactors, substantially as described.

9. The combination of a driven machine, a plurality of electric motors therefor, separate successively operating magnet-controlled admission and rheostatic-control contactors for each motor, means for initiating the operation of the admission contactors, control contacts closed by the first operating admission contactors for admitting current to the subsequently operating admission contactors, means for initiating the operation of the rheostatic-control contactors after the admission contactors have operated in reversed order as to the motors controlled, and control contacts closed by the first operating rheostatic-control contactors for admitting current to the subsequently operating rheostatic-control contactors, substantially as described.

10. The combination with an electric motor, of a source of supply, a braking circuit, forward and backward admission contactors for effecting motor connections with the source of supply, a dynamic-brake contactor for effecting motor connections to the braking circuit, means for limiting the period of closure of the dynamic-brake contactor, a control circuit through the dynamic-brake contactor magnet which includes control contacts that are closed when one of the forward and one of the backward admission contactors are open, forward and backward pilot relays, a reversing switch, control circuits through the pilot relays each of which includes corresponding contacts in the reversing switch and control contacts that are closed when the dynamic-brake contactor is closed, connections around these control contacts for each pilot relay which includes control contacts that are closed when it is closed, and control circuits through the admission contactors each of includes corresponding contacts on the reversing switch, contacts which are closed when the dynamic-brake contactor is open, and the control contacts which are closed when the corresponding pilot relays are closed, substantially as described.

11. The combination with an electric motor, of a source of supply, a braking circuit, a pair of admission contactors for effecting motor connections with the source of supply for forward running, a pair of admission contactors for effecting motor connections with the source of supply for backward running, a dynamic-brake contactor for effecting motor connections to the braking circuit, means for limiting the period of closure of the dynamic-brake contactor, a control circuit through the dynamic-brake contactor magnet which includes control contacts that are closed when one of the forward admission contactors and one of the backward admission contactors are open, a reversing switch, control circuits through one of the forward and one of the backward admission contactors each of which includes corresponding contacts on the reversing switch and control contacts that are closed when the dynamic-brake contactor is closed, connections around these control contacts for each admission contactor which includes control contacts that are closed when it is closed, and control circuits through the other forward and the other backward admission contactors, each of which includes corresponding contacts on the reversing switch, contacts which are closed when the dynamic-brake contactor is open and the control contacts which are closed when the other corresponding admission contactors are closed, substantially as described.

12. The combination with an electric motor, of a source of supply, forward, backward and braking circuits, motor contactors for forming these circuits, control circuits through the contactor magnets, a protection relay for introducing resistance into the control circuits, a reversing switch for initiating the operation of the control circuits, means for operating the circuits in proper sequence and operating the protection relay at the conclusion of the regular sequence of operation, a quick-stop switch with a running, a quick-stop and an intermediate off position, having contacts in the quick-stop position for establishing the control circuits which operate the contactors to establish the motor braking circuit, and automatic means for throwing the switch from the quick-stop to the off position, substantially as described.

13. The combination with an electric motor, of a source of supply, a braking circuit, forward and backward admission contactors for effecting motor connections with the source of supply, a dynamic-brake contactor for effecting motor connections to the braking circuit, a control circuit through the dynamic-brake contactor magnet, a reversing switch with contacts in the circuits of the admission contactor magnets, a quick-stop switch with a running, a quick-stop and an intermediate off position, contacts made by the switch in the running position in series with the circuits of the admission contactor magnets, and contacts made by the switch in the quick-stop position in the control circuit through the dynamic-brake contactor, substantially as described.

14. The combination of a driven machine, a plurality of electric motors therefor, separate magnet-controlled contactors for closing the several motor operating circuits of each motor, control contacts operated by the corresponding contactors for each motor operating circuit in series in the circuits of contactor magnets for controlling other motor operating circuits, and a cutout switch for the contactor magnets for each motor which operates on cutting out the magnets to bridge the control contacts of the magnets which are cut out, substantially as described.

15. The combination of a driven machine, a plurality of electric motors therefor, separate corresponding successively operating magnet-controlled contactors for each motor, means for initiating the operation of the contactors, control contacts closed by the first operating contactors for admitting current to the subsequently operating contactors and a cutout switch for the contactor magnets which operate on cutting out the magnets to bridge the control contacts of the magnets which are cut out, substantially as described.

16. The combination with an electric motor of a braking circuit and a resistance in the braking circuit sufficiently small in relation to the inductance of the circuit to permit the continuance of the induced braking current therein until the motor has reversed, substantially as described.

17. The combination with an electric motor of a braking circuit, a resistance in the braking circuit sufficiently small in relation to the inductance of the circuit to permit the continuance of the induced braking current therein until the motor has reversed, a source of supply for the motor, a switch for effecting reversal of connections with the source of supply, means for connecting the motor to the braking circuit on operation of the reversing switch, and means for delaying the completion of reversed connections until the motor has reversed, substantially as described.

Signed by me at New York, N. Y., this third day of January, 1913.

GANO DUNN.

Witnesses:
SAMUEL W. BALCH,
EDWARD W. ASHMEAD.